US012759841B2

(12) United States Patent
Rookey

(10) Patent No.: US 12,759,841 B2
(45) Date of Patent: Oct. 13, 2026

(54) SYSTEM AND METHOD FOR MEASURING TENSION MEMBER ELONGATION

(71) Applicant: OTIS ELEVATOR COMPANY, Farmington, CT (US)

(72) Inventor: Ralle A. Rookey, Suffield, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 527 days.

(21) Appl. No.: 18/382,581

(22) Filed: Oct. 23, 2023

(65) Prior Publication Data

US 2025/0128913 A1 Apr. 24, 2025

(51) Int. Cl.
*B66B 5/00* (2006.01)
*B66B 5/12* (2006.01)
*B66B 7/12* (2006.01)

(52) U.S. Cl.
CPC .......... *B66B 5/0031* (2013.01); *B66B 5/0087* (2013.01); *B66B 5/12* (2013.01); *B66B 7/1207* (2013.01); *B66B 7/1238* (2013.01)

(58) Field of Classification Search
CPC ............................ B66B 5/0087; B66B 7/1207
See application file for complete search history.

(56) References Cited

U.S. PATENT DOCUMENTS 4,852,263 A * 8/1989 Kerr ....................... G01B 7/046 33/735
5,127,493 A * 7/1992 Yasuda ............... B66B 11/0055 187/406
5,353,893 A * 10/1994 Sun ......................... B66B 7/068 187/412
5,890,564 A * 4/1999 Olsen .................... B66B 7/1215 187/250
5,992,574 A * 11/1999 Olsen .................... B66B 7/1215 73/158
6,223,862 B1 * 5/2001 Barnes ...................... B66B 7/06 187/412
6,412,264 B1 * 7/2002 De Josez ............. D07B 1/0686 57/232

(Continued)

FOREIGN PATENT DOCUMENTS

EP 3456674 A1 * 3/2019 ............. B66B 17/12
EP 3456674 B1 * 4/2020 ............. B66B 17/12

(Continued)

*Primary Examiner* — Shawki S Ismail
(74) *Attorney, Agent, or Firm* — Carlson, Gaskey & Olds, P.C.

(57) ABSTRACT

An apparatus and method for an elevator system includes an elevator car that is supported for movement within a hoistway by at least one suspension member and a counterweight that is coupled to the elevator car with the at least one suspension member. The at least one suspension member is supported on a machine sheave at a location between the elevator car and the counterweight. The system detects a presence of one of the counterweight or elevator car as an initial detection, and subsequently detects a presence of the other of the counterweight or the elevator car as a subsequent detection. The system then determines an amount of travel of the elevator car that occurs between the initial detection and the subsequent detection to determine an amount of elongation of the at least one suspension member.

18 Claims, 2 Drawing Sheets

EVENT 1

(56) References Cited

U.S. PATENT DOCUMENTS

| | | | | |
|---|---|---|---|---|
| 7,849,666 | B2 * | 12/2010 | Kirth | D07B 1/148 57/210 |
| 8,851,239 | B2 * | 10/2014 | Nakamori | B66B 7/1215 187/393 |
| 10,207,898 | B2 * | 2/2019 | Kalliomäki | B66B 5/0018 |
| 12,384,658 | B2 * | 8/2025 | Dold | B66B 7/1215 |
| 2005/0187052 | A1 * | 8/2005 | Yokoyama | F16H 7/1281 474/135 |
| 2006/0232789 | A1 * | 10/2006 | Oh | G01D 5/305 356/614 |
| 2007/0000736 | A1 * | 1/2007 | Shikai | B66B 5/02 187/393 |
| 2009/0320436 | A1 * | 12/2009 | Kirth | D07B 1/148 87/1 |
| 2015/0197408 | A1 * | 7/2015 | St. Germain | D07B 1/148 340/668 |
| 2015/0204425 | A1 * | 7/2015 | Lindsay | F16M 11/2092 474/117 |
| 2016/0272462 | A1 * | 9/2016 | Fargo | B66B 11/08 |
| 2016/0311649 | A1 * | 10/2016 | Puranen | B66B 5/0018 |
| 2018/0363241 | A1 * | 12/2018 | Ernst | B66C 15/06 |
| 2019/0368862 | A1 * | 12/2019 | Murray | B65G 15/30 |
| 2020/0071131 | A1 * | 3/2020 | Kato | G06T 7/0002 |
| 2021/0221645 | A1 * | 7/2021 | Kwon | B66B 5/0031 |
| 2022/0063768 | A1 * | 3/2022 | Fields | B63B 21/04 |
| 2022/0219739 | A1 * | 7/2022 | Pfeifer | B61B 12/022 |
| 2022/0274802 | A1 * | 9/2022 | Villa | B66B 1/3492 |
| 2023/0348229 | A1 * | 11/2023 | Laakso | B66B 5/02 |
| 2025/0122050 | A1 * | 4/2025 | Roberts | B66B 1/3492 |

FOREIGN PATENT DOCUMENTS

| | | | | | |
|---|---|---|---|---|---|
| JP | 4939698 | B2 | * | 5/2012 | |
| JP | 6491365 | B1 | * | 3/2019 | |
| JP | 2020040813 | A | * | 3/2020 | |
| JP | 2021084796 | A | * | 6/2021 | |
| JP | 7047050 | B1 | * | 4/2022 | B66B 7/1223 |

* cited by examiner

SYSTEM AND METHOD FOR MEASURING TENSION MEMBER ELONGATION

BACKGROUND

Elevator systems are in widespread use for carrying passengers between various levels in buildings, for example. Some elevator systems are traction-based in which a suspension assembly, sometimes referred to as roping, suspends the elevator car and a counterweight. The suspension assembly also facilitates movement of the elevator car when needed. Traditional suspension assemblies include round steel ropes. Some elevator systems have included other types of suspension members, such as flat belts or other types of ropes that have tension members encased in a compressible polymer jacket. Elongation of suspension members, especially coated suspension members, is an indication of life/retained breaking strength. As elongation occurs on a very small scale, it can be challenging to measure repeatedly and accurately.

SUMMARY

An illustrative example elevator system includes: at least one suspension member that supports an elevator car and facilitates movement of the elevator car in a hoistway; a machine sheave supporting the at least one suspension member; a counterweight coupled to the elevator car with the at least one suspension member; a counterweight sensor that detects a presence of the counterweight; a car sensor that detects a presence of the elevator car; an encoder that starts determining travel distance as soon as one of the counterweight sensor or car sensor is triggered; and a control system that generates a control signal to use the encoder to determine an amount of travel of the elevator car that occurs between triggering one of the counterweight sensor and car sensor and triggering of the other of the counterweight sensor and the car sensor.

In addition to one or more of the features described above, or as an alternative, the counterweight sensor comprises a single discrete sensor positioned at a fixed location in the hoistway.

In addition to one or more of the features described above, or as an alternative, the single discrete sensor comprises a limit switch, photoelectric sensor, or proximity sensor positioned on a counterweight side of the hoistway.

In addition to one or more of the features described above, or as an alternative, the car sensor comprises a single discrete sensor positioned at a fixed location in the hoistway.

In addition to one or more of the features described above, or as an alternative, the single discrete sensor comprises a limit switch, photoelectric sensor, or proximity sensor positioned on a car side of the hoistway.

In addition to one or more of the features described above, or as an alternative, the car sensor comprises a door landing zone sensor.

In addition to one or more of the features described above, or as an alternative, the encoder comprises a machine encoder associated with the machine sheave, and wherein the amount of travel is recorded between the triggering of the one of the counterweight sensor and the car sensor and the triggering of the other of the counterweight sensor and the car sensor.

In addition to one or more of the features described above, or as an alternative, the encoder comprises a car encoder associated with the elevator car.

In addition to one or more of the features described above, or as an alternative, a distance between the counterweight sensor and the car sensor remains fixed.

In addition to one or more of the features described above, or as an alternative, the control signal is only generated if the elevator car is empty and traveling at a constant velocity between the triggering of the one of the counterweight sensor and the car sensor and triggering of the other of the counterweight sensor and the car sensor.

In addition to one or more of the features described above, or as an alternative, the control system monitors the amount of travel over time to determine an elongation of the at least one suspension member, and generates an indicator signal when one or more predetermined conditions are met indicating that the at least one suspension member should be replaced.

In addition to one or more of the features described above, or as an alternative, when the elevator car is traveling downwards, the counterweight sensor first detects a presence of the counterweight followed by the car sensor detecting a presence of the elevator car, or the car sensor first detects a presence of the elevator car followed by the counterweight sensor detecting the presence of the counterweight.

In addition to one or more of the features described above, or as an alternative, when the elevator car is traveling upwards, the counterweight sensor first detects a presence of the counterweight followed by the car sensor detecting a presence of the elevator car, or the car sensor first detects the presence of the elevator car followed by the counterweight sensor detecting the presence of counterweight.

An illustrative example method comprises an elevator car that is supported for movement within a hoistway by at least one suspension member, a counterweight that is coupled to the elevator car with the at least one suspension member, and the at least one suspension member being supported on a machine sheave at a location between the elevator car and the counterweight, the method further comprising: detecting a presence of one of the counterweight or elevator car as an initial detection; subsequently detecting a presence of the other of the counterweight or the elevator car as a subsequent detection; and determining an amount of travel of the elevator car that occurs between the initial detection and the subsequent detection to determine an amount of elongation of the at least one suspension member.

In addition to one or more of the features described above, or as an alternative, the method further includes positioning a single discrete sensor at a fixed location in the hoistway to detect the presence of the counterweight, and positioning a single discrete sensor at a fixed location in the hoistway to detect the presence of the elevator car.

In addition to one or more of the features described above, or as an alternative, the method further includes providing a machine encoder associated with the machine sheave, and recording the amount of travel of the machine sheave between the initial detection and the subsequent detection.

In addition to one or more of the features described above, or as an alternative, the method further includes providing a car encoder associated with the elevator car, and determining the amount of travel of the elevator car between the initial detection and the subsequent detection.

In addition to one or more of the features described above, or as an alternative, the method further includes monitoring the amount of travel over time to determine elongation of the at least one suspension member, and generating an indicator signal when one or more predetermined conditions are met to indicate that the at least one suspension member should be replaced.

In addition to one or more of the features described above, or as an alternative, when the elevator car is traveling downwards, the method includes: first detecting a presence of the counterweight followed by detecting a presence of the elevator car; or first detecting a presence of the elevator car followed by detecting the presence of the counterweight.

In addition to one or more of the features described above, or as an alternative, when the elevator car is traveling upwards, the method includes: first detecting a presence of the counterweight followed by detecting a presence of the elevator car; or first detecting the presence of the elevator car followed by detecting the presence of the counterweight.

The various features and advantages of an example embodiment will become apparent to those skilled in the art from the following detailed description. The drawings that accompany the detailed description can be briefly described as follows.

DETAILED DESCRIPTION

Embodiments of this disclosure provide for a system and method of measuring elongation of suspension members that is simple and cost effective.

Figure 1:
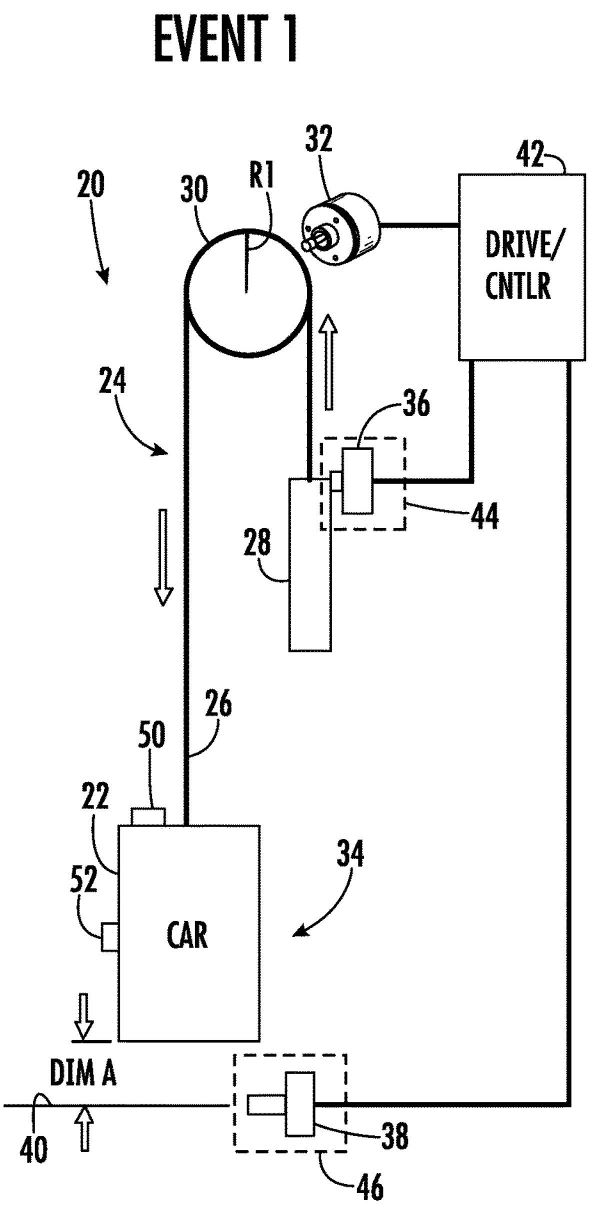
FIG. 1 schematically illustrates selected portions of an elevator system incorporating the measuring system of the disclosure in a first position.

FIG. 1 schematically illustrates selected portions of an elevator system 20. An elevator car 22 is supported by a roping arrangement or suspension assembly 24 that includes one or more suspension members 26. The elevator car 22 is coupled to a counterweight 28 by the suspension members 26. In one example, the suspension members 26 comprises coated ropes or coated steel belts where tension members are encased in a compressible polymer jacket.

A machine sheave 30 is associated with a machine encoder 32. The machine sheave 30 facilitates movement of the elevator car 22 within the hoistway 34. As the suspension members 26 move in response to rotation of the machine sheave 30, the elevator car 22 and counterweight 28 move vertically. The suspension members 26 may move around additional sheaves (not shown) as the elevator car 22 moves between landings or levels.

In one example, the machine sheave 30 supports the suspension member 26 at a location between the counterweight 28 and the elevator car 22. A measuring system includes at least a first sensor 36 that detects a presence of the counterweight 28 and a second sensor 38 that detects the presence of the elevator car 22. A control system includes a drive/controller 42 that generates a control signal to use the encoder 32 to record an amount of travel between triggering of the first sensor 36 and triggering of the second sensor 38.

In one example, the first sensor 36 comprises a single discrete sensor positioned at a fixed location 44 in the hoistway 34. In one example, the single discrete sensor is positioned on a counterweight side of the hoistway 34. In one example, the single discrete sensor comprises a limit switch, photoelectric sensor, proximity sensor, or similar sensing device; however, other types of detecting sensors could also be used. In one example, the second sensor 38 comprises a single discrete sensor positioned at a fixed location 46 in the hoistway 34. In one example, the single discrete sensor is positioned on a car side of the hoistway 34. In one example, the single discrete sensor comprises a limit switch, photoelectric sensor, proximity sensor, or similar sensing device; however, other types of detecting sensors could also be used. In one example, the sensor 38 comprises a door landing zone sensor. The door landing zone sensor is an existing sensor that is used to determine when the elevator car has reached the associated landing. The position of the first 36 and second 38 sensors does not change such that the distance between the sensors 36, 38 remains fixed and constant.

In one example, the encoder comprises the machine encoder 32 that is associated with the machine sheave 30. Based on fixed dimensions of the machine components, the machine encoder 32 records the travel between the triggering of the first sensor 36 and the triggering of the second sensor 38, and the linear distance travelled can be calculated.

In one example, the first sensor 36 is to be placed in a location such that the first sensor 36 detects the presence of the counterweight 28 as the elevator car 22 approaches the second sensor 38 from a given direction (Event 1). Dependent upon the relative positioning of sensor 36 and sensor 38, the direction of the car motion during this period can be upwards or downwards. In one example, the second sensor 38 is an existing door landing zone sensor, the designated floor is the lobby, and the given direction is downward.

As soon as the first sensor 36 is triggered, the drive/controller 42 initiates recording the travel of the machine sheave 30 via the machine encoder 32 until the second sensor 38 is reached (Event 2). The travel of the machine sheave 30 is proportional to a distance A the elevator car 22 traveled between triggering the first sensor 36 and triggering the second sensor 38. As the suspension members 26 stretch over time, this distance A will decrease proportional to the elongation; therefore, the change in the travel of the machine sheave 30 between Events 1 and 2 is directly proportional to elongation of the suspension members 26. Thus, as the distance A decreases, the travel of the machine sheave 30 will proportionally decrease.

While the example shows the use of a machine encoder 32, the encoder could be located/configured in a variety of ways, with the purpose simply being having the ability to record distance traveled. In an alternative configuration, the encoder can comprise a car-mounted encoder 50 associated with the elevator car 22. In this example, the amount of travel is recorded via the car encoder 50 between the triggering of the first sensor 36 and the triggering of the second sensor 38.

While the example has included the first sensor 36 located on the counterweight side of the hoistway 34 and the second sensor 38 being located on the car side of the hoistway 34, the order of input from the sensors can be reversed. In an alternative configuration, the first sensor 38 is on the car side of the hoistway 34 and the second sensor 36 is on the counterweight side of the hoistway 34. As previously mentioned, the direction of car motion during the "Event" can be upwards or downwards. As a result, this method can be utilized in four sensor/motion arrangements: (1) the elevator car 22 traveling downwards with the sensor 36 first detecting presence of the counterweight 28 followed by the sensor 38 detecting a presence of the elevator car 22; (2) the elevator car 22 traveling upwards with the sensor 36 first detecting presence of the counterweight 28 followed by the sensor 38 detecting the presence of the elevator car 22; (3) the elevator car 22 traveling downwards with the sensor 38 first detecting presence of the elevator car 22 followed by the sensor 36 detecting the presence of the counterweight 28; or (4) the elevator car 22 traveling upwards with the sensor 38 first detecting presence of the elevator car 22 followed by the sensor 36 detecting the presence of counterweight 28.

The drive/controller 42 is part of the control system and includes one or more processors that are used to initiate recording of the sheave travel, receive input from the sensors 36, 38, and determine the elongation based data generated by the encoder. In one example, the processor includes one or more computing devices and associated memory. The processor is programmed or otherwise configured to use the different types of information to quantify the proportional relationship between the change in the travel over time of the machine sheave between Events 1 and 2 and the elongation of the suspension members 26.

In one example, in order to minimize error, the drive/controller 42 will only have the measurement take place if a load weighing sensor 52 detects a certain load condition, such as an empty elevator car 22 and if the elevator car 22 is traveling at constant velocity. Determination of velocity can be made via known motion control parameters or via input from existing elevator system sensors, including existing encoder(s). Only taking measurement under these conditions allows the measurement to be unaffected by car loading and possible anomalies in speed, both of which could affect the forces acting on the suspension member(s) and therefore the amount of stretch experienced by the suspension member(s).

Figure 2:
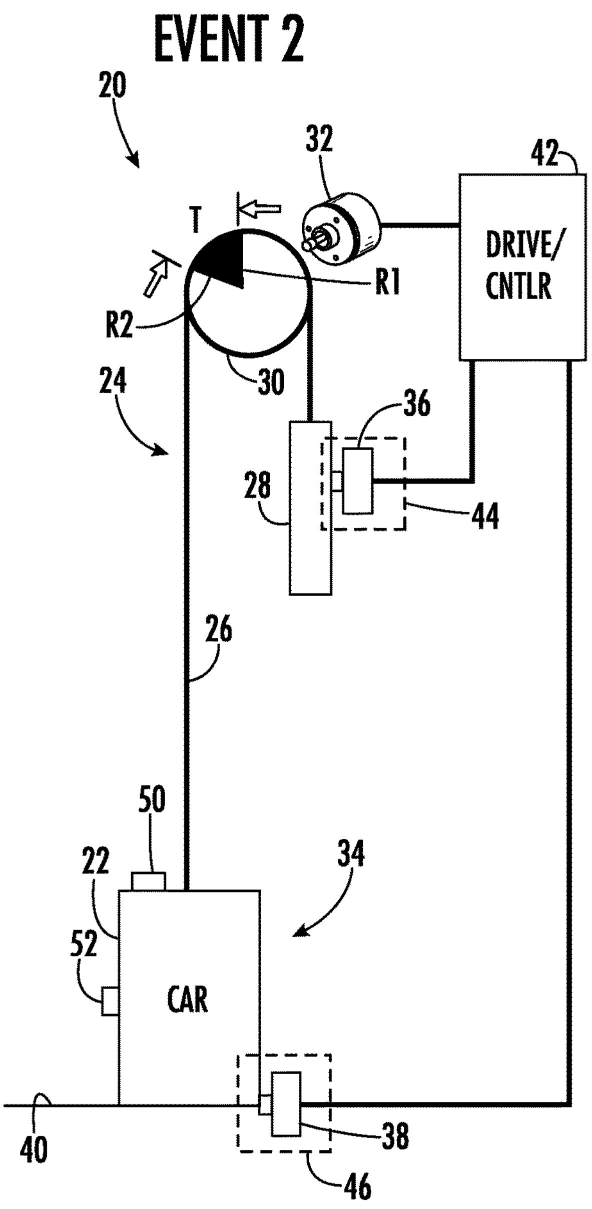
FIG. 2 schematically illustrates selected portions of an elevator system incorporating the measuring system of the disclosure in a second position.
Figure 3:
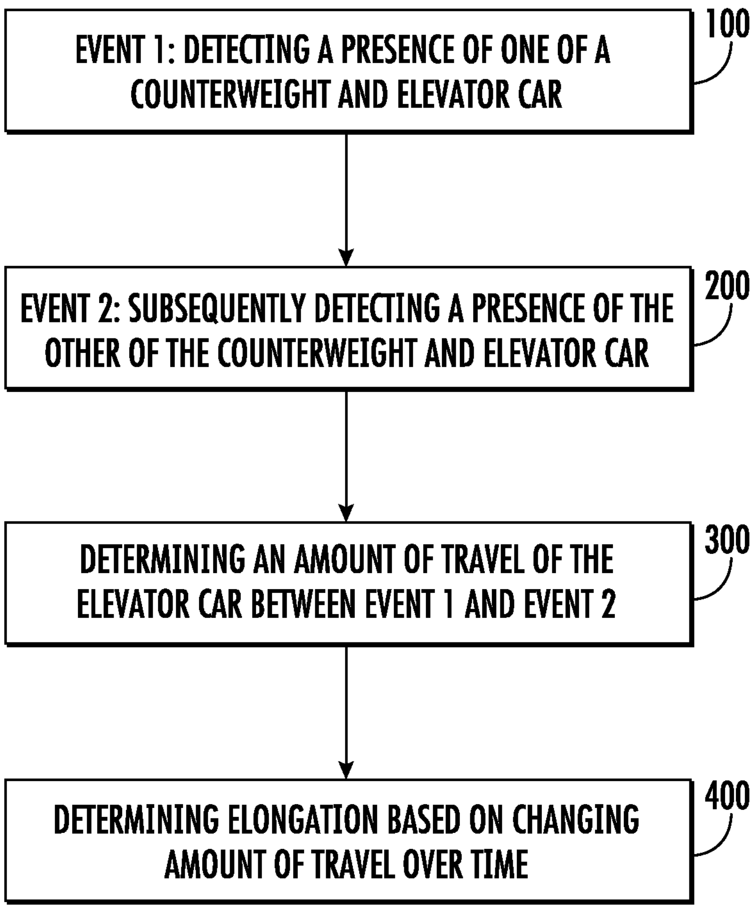
FIG. 3 is a flowchart diagram describing a method of monitoring tension members in an elevator system.

As shown in FIG. 3, the subject disclosure proposes a method of automatically measuring and tracking elongation of the suspension member over its service life. First, a sensor detects the presence of the one of the counterweight or the elevator car from a given direction as shown at 100 (Event 1) to provide an initial detection. Once Event 1 is triggered, a step of recording an amount of travel T (FIG. 2) is initiated as indicated at R1 (FIG. 1). Subsequently, another sensor detects the presence of the other of the counterweight or the elevator car as indicated at 200 (Event 2) to provide a subsequent detection. Once Event 2 is triggered, recording of the amount of travel is stopped as indicated at R2 (FIG. 2). Next, the amount of travel T (FIG. 2) is determined between Events 1 and 2 as indicated at 300. The travel of the machine sheave during this period is proportional to the distance the car traveled between the triggering of the sensors, i.e. distance A. As the suspension members stretch over time, this distance A will decrease proportional to the elongation; therefore, the change in the travel of the machine sheave is directly proportional to elongation of the suspension members. Thus, elongation can be determined based on a changing amount of travel over time as indicated at 400.

The subject disclosure proposes a method to measure and track elongation without the addition of expensive measuring devices by rather taking advantage of the high resolution available by an encoder, such as a machine encoder, in combination with two inexpensive, discrete sensors, of which one or more may be existing within the hoistway, such as an existing door zone sensor. Since the drive/controller performs this function, this measurement can be performed regularly without mechanic intervention. Elongation can be monitored remotely, and alerts or indicator signals can be generated automatically when one or more predetermined conditions are met such that suspension members can be replaced as needed. Those skilled in the art who have the benefit of this description will be able to determine the one or more predetermined conditions that would be applied for these purposes.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An elevator system, comprising:
- at least one suspension member that supports an elevator car and facilitates movement of the elevator car in a hoistway;
- a machine sheave supporting the at least one suspension member;
- a counterweight coupled to the elevator car with the at least one suspension member;
- a counterweight sensor that detects a presence of the counterweight;
- a car sensor that detects a presence of the elevator car;
- an encoder that starts determining travel distance as soon as one of the counterweight sensor or car sensor is triggered; and
- a control system that generates a control signal to use the encoder to determine an amount of travel of the elevator car that occurs between triggering one of the counterweight sensor and car sensor and triggering of the other of the counterweight sensor and the car sensor;
- wherein the control system monitors the amount of travel over time to determine an elongation of the at least one suspension member, and generates an indicator signal when one or more predetermined conditions are met indicating that the at least one suspension member should be replaced.

2. The elevator system of claim 1, wherein the counterweight sensor comprises a single discrete sensor positioned at a fixed location in the hoistway.

3. The elevator system of claim 2, wherein the single discrete sensor comprises a limit switch, photoelectric sensor, or proximity sensor positioned on a counterweight side of the hoistway.

4. The elevator system of claim 1, wherein the car sensor comprises a single discrete sensor positioned at a fixed location in the hoistway.

5. The elevator system of claim 4, wherein the single discrete sensor comprises a limit switch, photoelectric sensor, or proximity sensor positioned on a car side of the hoistway.

6. The elevator system of claim 1, wherein the car sensor comprises a door landing zone sensor.

7. The elevator system of claim 1, wherein the encoder comprises a machine encoder associated with the machine sheave, and wherein the amount of travel is recorded between the triggering of the one of the counterweight sensor and the car sensor and the triggering of the other of the counterweight sensor and the car sensor.

8. The elevator system of claim 1, wherein the encoder comprises a car encoder associated with the elevator car.

9. The elevator system of claim 1, wherein a distance between the counterweight sensor and the car sensor remains fixed.

10. The elevator system of claim 1, wherein the control signal is only generated if the elevator car is empty and traveling at a constant velocity between the triggering of the one of the counterweight sensor and the car sensor and triggering of the other of the counterweight sensor and the car sensor.

11. The elevator system of claim 1, wherein when the elevator car is traveling downwards, the counterweight sensor first detects a presence of the counterweight followed by the car sensor detecting a presence of the elevator car, or the car sensor first detects a presence of the elevator car followed by the counterweight sensor detecting the presence of the counterweight.

12. The elevator system of claim 1, wherein when the elevator car is traveling upwards, the counterweight sensor first detects a presence of the counterweight followed by the car sensor detecting a presence of the elevator car, or the car sensor first detects the presence of the elevator car followed by the counterweight sensor detecting the presence of counterweight.

13. A method wherein an elevator car is supported for movement within a hoistway by at least one suspension member, a counterweight is coupled to the elevator car with the at least one suspension member, and the at least one suspension member is supported on a machine sheave at a location between the elevator car and the counterweight, the method comprising:

detecting a presence of one of the counterweight or elevator car as an initial detection;

subsequently detecting a presence of the other of the counterweight or the elevator car as a subsequent detection; and determining an amount of travel of the elevator car that occurs between the initial detection and the subsequent detection to determine an amount of elongation of the at least one suspension member;

including monitoring the amount of travel over time to determine elongation of the at least one suspension member, and generating an indicator signal when one or more predetermined conditions are met to indicate that the at least one suspension member should be replaced.

14. The method of claim 13, including positioning a single discrete sensor at a fixed location in the hoistway to detect the presence of the counterweight, and positioning a single discrete sensor at a fixed location in the hoistway to detect the presence of the elevator car.

15. The method of claim 13, including providing a machine encoder associated with the machine sheave, and recording the amount of travel of the machine sheave between the initial detection and the subsequent detection.

16. The method of claim 13, including providing a car encoder associated with the elevator car, and determining the amount of travel of the elevator car between the initial detection and the subsequent detection.

17. The method of claim 13, wherein when the elevator car is traveling downwards, the method includes:

first detecting a presence of the counterweight followed by detecting a presence of the elevator car; or first detecting a presence of the elevator car followed by detecting the presence of the counterweight.

18. The method of claim 13, wherein when the elevator car is traveling upwards, the method includes:

first detecting a presence of the counterweight followed by detecting a presence of the elevator car; or first detecting the presence of the elevator car followed by detecting the presence of the counterweight.

* * * * *